United States Patent [19]
Huang et al.

[11] Patent Number: 5,442,474
[45] Date of Patent: Aug. 15, 1995

[54] SELF-ROUTING OPTICAL COMMUNICATION NODE USING SAGNAC GATES

[75] Inventors: Alan Huang, Middletown; Norman A. Whitaker, Jr., Atlantic Highlands, both of N.J.

[73] Assignee: AT&T Corp., Murray Hill, N.J.

[21] Appl. No.: 297,435

[22] Filed: Aug. 29, 1994

Related U.S. Application Data

[63] Continuation of Ser. No. 107,472, Jul. 30, 1993, abandoned.

[51] Int. Cl.⁶ .................................... H04J 14/00
[52] U.S. Cl. ........................ 359/139; 359/158; 359/135; 370/58.1; 370/60.1
[58] Field of Search ............... 359/135, 139, 158; 370/58.1, 58.2, 58.3, 60, 60.1, 54

[56] References Cited

U.S. PATENT DOCUMENTS

| | | | |
|---|---|---|---|
| 4,731,878 | 3/1988 | Vaidya | 359/165 |
| 4,742,572 | 5/1988 | Yokoyama | 455/607 |
| 4,873,681 | 10/1989 | Authurs et al. | 370/3 |
| 4,939,721 | 7/1990 | De Bosio | 370/60 |
| 4,962,987 | 10/1990 | Doran | 380/96.15 |
| 5,045,714 | 9/1991 | Park et al. | 370/112 |
| 5,077,727 | 12/1991 | Suzuki | 359/123 |
| 5,144,375 | 9/1992 | Gabriel et al. | 356/345 |
| 5,144,619 | 9/1992 | Munter | 370/60.1 |
| 5,157,654 | 10/1992 | Cisneros | 370/60 |
| 5,179,552 | 1/1993 | Chao | 370/60 |
| 5,237,753 | 8/1993 | Dhuey et al. | 370/112 |
| 5,289,302 | 2/1994 | Eda | 359/123 |
| 5,301,055 | 4/1994 | Bagchi et al. | 359/139 |

*Primary Examiner*—Thomas P. Noland
*Assistant Examiner*—Richard A. Moller
*Attorney, Agent, or Firm*—John A. Caccuro

[57] ABSTRACT

A Sagnac gate-based self-routing optical signal switching node demultiplexes each channel of data bits of an N channel multiplexed optical data signal to one of a plurality of output terminals in accordance with the routing bit(s) of each data channel received in the N channel multiplexed optical data signal. In one embodiment, each data channel includes multiple routing bits enabling greater demultiplexer selectivity.

14 Claims, 4 Drawing Sheets

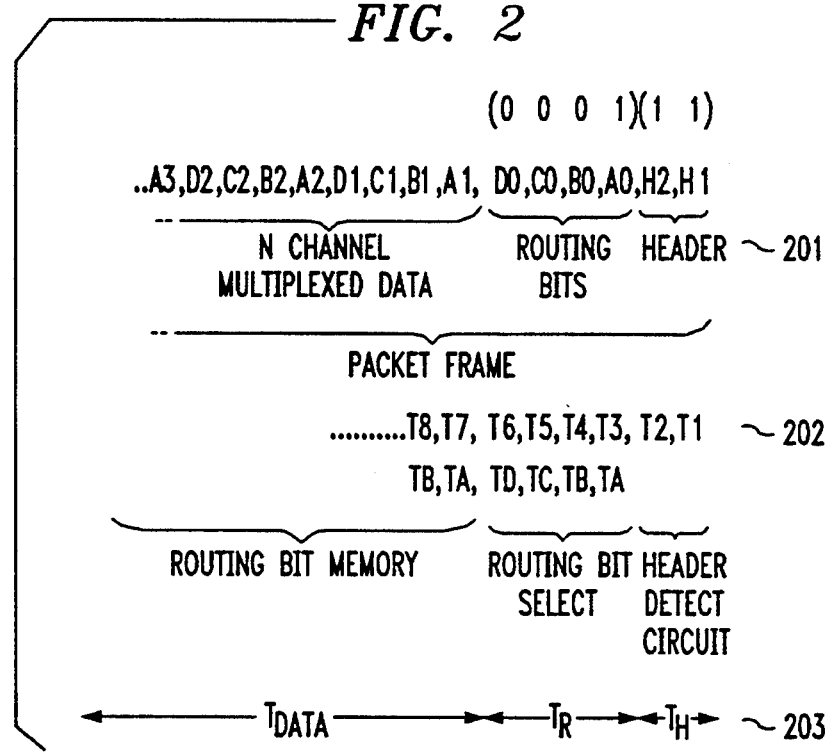
FIG. 2
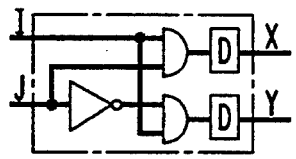
FIG. 3A
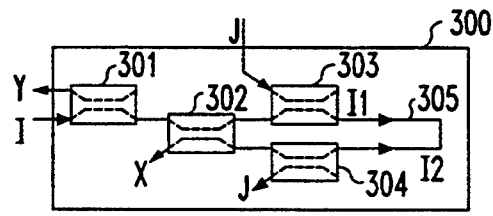
FIG. 3B
FIG. 3C
| I | J | X | Y |
|---|---|---|---|
| 0 | 0 | 0 | 0 |
| 0 | 1 | 0 | 0 |
| 1 | 0 | 0 | 1 |
| 1 | 1 | 1 | 0 |

FIG. 4A
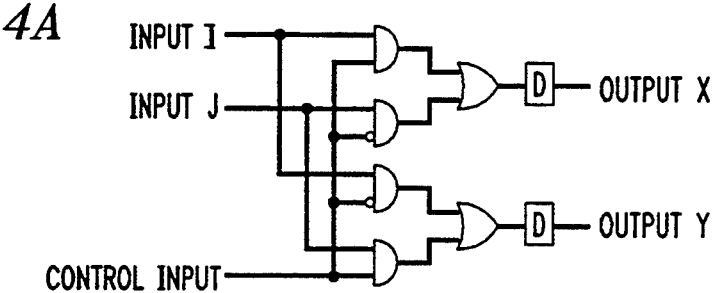
FIG. 4B
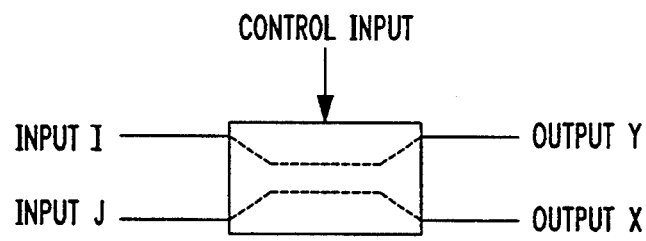
FIG. 4C
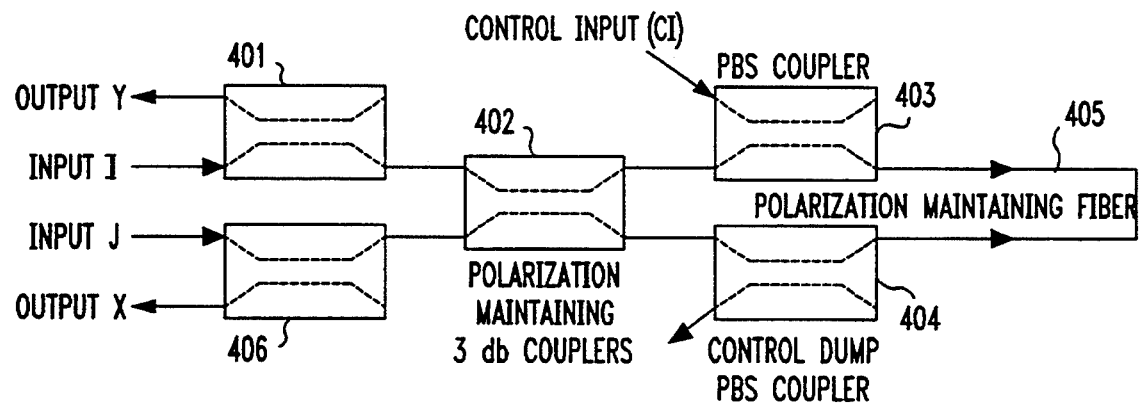
FIG. 4D
| I | J | Y | X | CI | Y | X | CI | |
|---|---|---|---|----|---|---|----|---|
| 0 | 0 | 0 | 0 | 0 | 0 | 0 | 1 | —411 |
| 0 | 1 | 0 | 1 | 0 | 1 | 0 | 1 | —412 |
| 1 | 0 | 1 | 0 | 0 | 0 | 1 | 1 | —413 |
| $1_I$ | $1_J$ | $1_I$ | $1_J$ | 0 | $1_J$ | $1_I$ | 1 | —414 |

SELF-ROUTING OPTICAL COMMUNICATION NODE USING SAGNAC GATES

This application is a continuation of application Ser. No. 08/107,472, filed on Jul. 30, 1993 now abandoned.

BACKGROUND OF THE INVENTION

This invention relates to optical communication circuits and, more particularly, to a self-routing optical communication node implemented using Sagnac optical fiber logic gates.

The speed of present-day electronics is limited by the mobility of electrons and holes in a semi-conductor to around five pico seconds (ps). Capacitance and inductance considerations add additional limits. The Sagnac optical fiber logic gate was developed as part of an effort to achieve an optical digital technology which is capable of clock rates much faster than electronics.

In Sagnac gates, while the issues of contrast, cascadability, logical completeness, temperature sensitivity, energy pulse reshaping, and mechanical stability were of initial concern, they have now been overcome. However, the latency exhibited by Sagnac gates has been a "mixed blessing". On one hand, the long latency has enabled Sagnac gates to reduce jitter tolerance. On the other hand, the long latency has complicated the design of combinatoric circuits requiring feedback. Sagnac gates have been used in a variety of circuit applications including, for example, those described in U.S. Pat. Nos. 5,144,375; 5,155,779; and 5,208,705 as well as those described in pending patent applications entitled "Optical Nyquist Rate Multiplexer and Demultiplexer", Ser. No. 07/961,599 filed on Oct. 15, 1992, by Alan Huang; and "Optical Communications System", Ser. No. 07/950,521 filed on Sep. 25, 1992, by Alan Huang and Ser. No. 07/961,606 filed on Oct. 15, 1992, by Alan Huang.

Notwithstanding, the above described design successes, the long latency of the Sagnac gates continue to present problems in circuits requiring the use of feedback or the storing of logic state information.

SUMMARY OF THE INVENTION

In accordance with the present invention, Sagnac gates are utilized to implement self-routing optical signal switching nodes for demultiplexing an N channel multiplexed optical data signal including a frame header and N channels of multiplexed routing and data bits. The self-routing node detects the start of a data frame using the header bits. The routing bits are used to control an optical demultiplexer circuit to route each of the N channels of data bits to one of a plurality of optical data output terminals.

More particularly, the self-routing node includes a frame header detector means for detecting frame header bits and generating a routing bit select signal which is used to control the storing of routing bits in a routing bit storage circuit. The routing bit storage circuit generates a channel data routing signal which controls a demultiplexer to route data bits of each channel to an output data terminal specified by the routing bits of that channel.

BRIEF DESCRIPTION OF THE DRAWING

In the drawings:

FIG. 2 shows a timing diagram useful in understanding the operation of the self-routing optical communication node of FIG. 1;

FIGS. 3A–3C illustrate an embodiment of a Sagnac gate as well as its logical equivalent circuit and truth table;

FIGS. 4A–4D illustrate an embodiment of a Sagnac exchange/bypass arrangement as well as its logical equivalent circuit and truth table.

DETAILED DESCRIPTION

Figure 1:
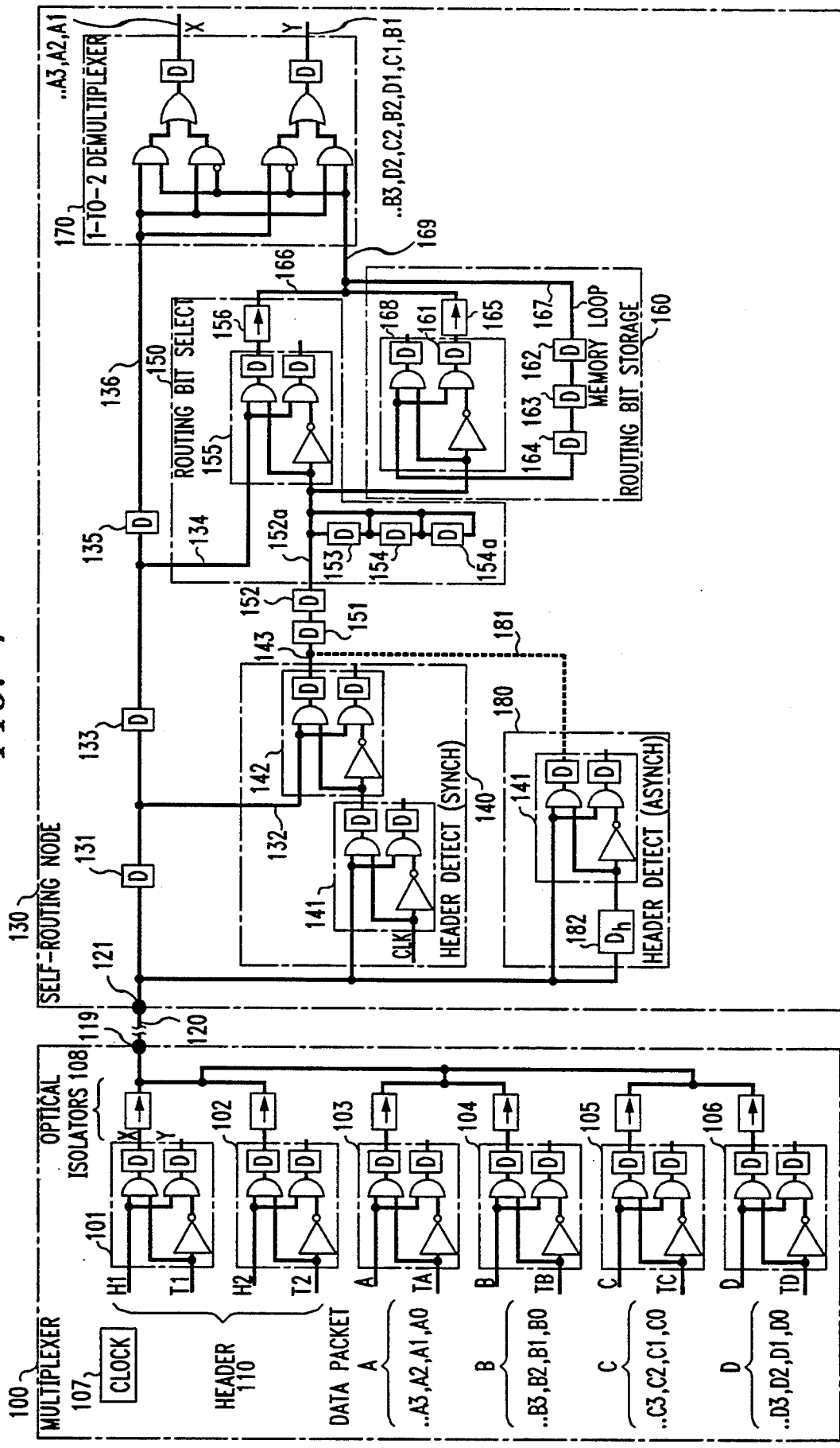
FIG. 1 shows an illustrative self-routing optical communications node, in accordance with the present invention, which routes a received multiplexer optical signal to one of a plurality of output paths.

Shown in FIG. 1 is an illustrative communication system useful for describing the self-routing optical communication node of the present invention. The communication system includes a multiplexer unit 100, a communication path 120 and a self-routing optical communication node designated as 130. Multiplexer 100 receives, in our illustrative example, four packets of data: packet A, packet B, packet C, packet D. Multiplexer 100 performs a four-way bit interleave multiplex function on the four-packet signals A–D. Additionally, multiplexer 100 includes circuitry for providing a header signal indicating the beginning of each frame of multiplexed optical data signal. The multiplexed optical data signal frame outputted at terminal 119 from multiplexer 100 is shown in 201 of FIG. 2 to include a header segment, a routing bit segment and a four-channel multiplex data segment.

Multiplexer 100 includes clock circuitry 107, which generates the time slot signals T1, T2, once per frame, and TA, TB, TC, TD, cyclically during the frame. The header signals H1 and H2 are only available and outputted at the beginning of a frame of data. The Sagnac gate 101 outputs a signal at terminal X only when the header signal H1 and the clock signal T1 is inputted to Sagnac gate 101. The operation of Sagnac gates 102–106 operate in a similar manner, i.e., an output is generated only when both the input data (e.g., data packet bit $A_0$) and clock signal (i.e., $t_A$) are present.

With reference to FIG. 3 we describe in detail the operation of a Sagnac gate (also referred to hereinafter as a Sagnac switch). FIG. 3A shows a logical equivalent circuit of the Sagnac fiber logic gate. Note, that the Sagnac gate equivalent circuit is shown with a delay element D which represents the inherent delay or latency of the Sagnac gate. FIG. 3B shows an actual Sagnac fiber logic gate. FIG. 3C shows a truth table describing the relationship between the inputs and outputs of a Sagnac logic gate. As shown in the truth table, an output appears at output port Y only when there is an input I and no input J. An output appears at port X when there is both an input I and an input J. Otherwise, both outputs at ports X and Y are zero for all other combinations of inputs I and J.

The Sagnac gate is an ultra-fast, all-optical fiber three-terminal device in which an optical control signal J can be used to control an input optical signal I. It is based on a fiber Sagnac interferometer, as shown in FIG. 3B, and consists of two polarization-preserving optical couplers 301 and 302, two polarization beam-splitting couplers 303 and 304, and a length of polarization maintaining optical fiber 305.

A Sagnac interferometer is formed by coupler 302, input control signal coupler 303, output control signal coupler 304 and optical fiber 305. A control signal is injected into the optical fiber 305 using coupler 303 and extracted from the optical fiber 305 using coupler 304.

A first optical input signal I is applied via the coupler 301 to coupler 302 of the Sagnac interferometer. The coupler 302 splits the input signal I into two counterclockwise propagating interferometer signals I1, I2 each of which travel on one of the optical fiber's axis of polarization. The two propagating interferometer signals I1, I2, in the absence of control signal J, traverse the optical fiber 305 (in opposite directions) and destructively interfere at the X output of the coupler 302 and constructively interfere in coupler 302 to form output Y. The Sagnac gate in the absence of optical control signal "J" functions as an optical mirror with the applied input signal "I" applied to and reflected out of the first coupler 301 as an output signal Y. If an optical control signal "J" is injected in the loop 305, on the other polarization axis, via coupler 303 in a clockwise direction, then the clockwise portion of the interferometer signal I1 would experience cross-phase modulation and travel ever so slightly faster than the counterclockwise propagating interferometer signal I2. With proper design and timing of the control pulse J, the two portions I1, I2 of the input signal I can be made to constructively interfere causing all of the signal to be transmitted out of the X output (and destructively interfere in coupler 302 so that no output appears at the Y output). Thus, the Sagnac gate (also referred to as a Sagnac switch) operates as a single-pole double-throw switch operating under control of control signal J.

The detailed operation of a Sagnac gate is described in U.S. Pat. No. 5,144,375 which issued on Sep. 1, 1992, in the names of Gabriel, Houh and Whitaker.

With joint reference to FIGS. 1 and 2 we describe how a multiplexed optical data signal frame is generated. The packet frame includes three sections; a header section $T_H$, a routing section $T_R$ and a data segment $T_{DATA}$. During the header segment, the header bits H1 and H2 are clocked by clock signals T1 and T2 to form outputs which are outputted, via terminal 119, over communication path 120 at the beginning of a packet frame. The clock circuit 107 generates the time slots T1 and T2 in a well-known manner. The header signals H1 and H2 exist only at the beginning of a packet frame, only during the header section $T_M$, and are outputted from Sagnac gates 101 and 102. The header bit pattern (H1 and H2) is made unique so that the header can be readily detected. The header bit pattern is made unique by using a unique spacing of the header bits or by using a unique header bit coding which ensures that the header bits are not confused with the routing and data bits. Appropriate changes to the design of header circuits 110 and 140 are made to implement the particular unique header utilized.

Each of the data packets A, B, C and D include routing bits designated by the subscript 0. Thus, for example, data packet A includes the routing bit $A_0$ and the data bits $A_1$, $A_2$, $A_3$, etc. The Sagnac gates 103–106 selectively gate data bits from data packets A–D, the routing bit segment TR and data bit segment TD of the multiplexed optical data signal frame. During time slot T3 of FIG. 2, the routing bit $A_0$ of data packet A is clocked by Sagnac 103 onto data communication path 120. As previously noted, the first bit of any data packet is the routing bit. In time slot T4, the routing bit $B_0$ from data packet B is outputted by Sagnac gate 104 onto communication path 120. Similarly, during time slots 5 and 6 the routing bits $C_0$ and $D_0$ of data packets C and D, respectively, are coupled onto communication path 120. Beginning in time slot T7 each of the Sagnac gates 103 through 106 selectively output one data bit from data packets A–D onto communication path 120. This is shown by 201 of FIG. 2. For illustrative purposes, in our example, we will assume that the header bits H1 and H2 are both at logic 1. Also, for illustrative purposes, we assume that routing bit $A_0$ is logic 1 while routing bits $B_0$, $C_0$ and $D_0$ are all logic 0.

The self-routing optical communication node 130 receives the four-channel multiplex data shown by 201 at input terminal 121. The self-routing optical communication node 130 includes a header detector circuit 140, a routing bit select circuit 150, a routing bit storage circuit 160 and a one-to-two demultiplexer circuit 170. The one-to-two demultiplexer 170 is implemented using a Sagnac exchange/bypass switch as will be described later.

The self-routing node 130 can be made to operate in a synchronous or an asynchronous mode. In a synchronous mode, the header detect circuit 140, which detects the beginning of the header, illustratively, includes two Sagnac gates 141 and 142 which detect the unique header bit pattern H1 and H2. The Sagnac gate 141 detects header bit H1 and its output enables Sagnac switch 142 to detect the second header bit H2.

In an asynchronous mode arrangement 180, the header enable signal 181 is generated when the circuit 180 detects the header bits H1 and H2 having the spacing $D_h$ (provided by delay circuit 182) which is different from the spacing D (e.g., 131) of the data pulses A1, B1, etc. Such a circuit is shown in the copending U.S. patent application, of A. Huang entitled "Optical Communication System," Ser. No. 07/961,606, filed on Oct. 15, 1992, which is incorporated by reference herein.

The delay circuit 131 (actually just a predetermined length of optical fiber) insures that when header bit H2 arrives at Sagnac gate 142 it occurs just prior to the output of Sagnac gate 141. (This is because the output of Sagnac gate 141 is the control signal for Sagnac gate 142, and hence must be inputted after the input signal). The delays 133 and 151 and 152 insure, respectively, that the received data signal on path 134 arrives at Sagnac gate 155 at a time approximately preceding the routing bit $A_0$ (i.e., a gated clock pulse) on path 152a generated by header detect circuit 140. The clock signal 143 outputted by header detect circuit 140 is outputted to routing bit select circuit 150. This clock signal 143 (also referred to as a header start or routing bit select signal) is used to generate a clock signal for time slots T3, T4, T5 and T6 using, respectively, delays 153, 154 and 154a. The time slot signals T3–T6 enable Sagnac gate 155 to load routing bits $A_0$–$D_0$, respectively, from path 134 into routing bit storage circuit 160 via path 166. After time slot T6 Sagnac gate 155 is no longer receiving time slot signals and, hence, no additional bits are gated by Sagnac gate 155 into routing bit storage 160.

The routing bits are received by routing bit storage 160 over path 166 from Sagnac gate 155 via optical isolator 156. The routing bits are stored on a memory loop 167 including delays 162, 163 and 164 which together with delays 161 of Sagnac gate 168 provide a circular store to store the four routing bits $A_0$–$D_0$. During the time slots T3–T6, Sagnac gate 168 in memory loop 167 clears any existing data bits in the memory loop 167 so that the new routing bits can be loaded into memory loop 167. Thus, at the end of time slot T6, the delay circuit 161 includes routing bit $A_0$, delay 164 stores routing bit $D_0$, delay circuit 163 stores routing bit $C_0$ and delay circuit 162 stores routing bit $B_0$. The routing bits $A_0$–$D_0$ continue to circulate in memory loop 167 and Sagnac gate 168 periodically every four time slots (TA–TD).

The routing bits $A_0$–$D_0$ are outputted from memory loop 167 to form a cyclically-recurring channel data routing signal which is sent over onto path 169 and are received by the demultiplexer 170. The optical isolators 156 and 165 prevent routing bits $A_0$–$D_0$ from going back into the routing bit selector circuit 150. These routing bits $A_0$–$D_0$ continue during the time interval TD (203 of FIG. 2) during which the four-channel multiplex data signal is received over communication path 120. The combination of delay circuits 131, 133 and 135 insure that when data bits (e.g., $A_1$) are received by demultiplexer 170 they will arrive at approximately the same time as the associated routing bit (i.e., $A_0$) received over path 169 from routing bit storage circuit 160. Similarly, when data bits $B_1$, $C_1$ and $D_1$ are received by demultiplexer 170, the routing bits $B_0$, $C_0$ and $D_0$ are used as the control signal (CI) for demultiplexer 170.

As previously noted, demultiplexer 170 is illustratively implemented using a Sagnac exchange/bypass switch which is shown in FIG. 4. With reference to FIG. 4, FIG. 4A shows the logical equivalent of the Sagnac exchange/bypass switch (utilized herein as a two-to-one demultiplexer). FIG. 4B shows a schematic representation of such a circuit. FIG. 4C shows a more detailed implementation of the Sagnac exchange/bypass switch. Shown in FIG. 4D is the truth table for the Sagnac exchange/bypass switch. The operation of a Sagnac exchange/bypass switch is described in our co-pending patent application entitled "Optical Crossbar Exchange Arrangement", Ser. No. 07/787989, filed on Nov. 5, 1991, by Messrs. Huang and Whitaker, which application is incorporated by reference herein.

The circuit of FIG. 4C includes all the elements of the circuit of FIG. 3B except that it has one additional coupler 406. The circuit of FIG. 4C also operates like the circuit of FIG. 3B when one input I is applied. Recall, when input I is applied via coupler 401 to the Sagnac gate of FIG. 4C, in the absence of a control input CI, the Sagnac interferometer acts as a mirror and outputs the signal as output Y. When a control input pulse CI is present, however, the input signal, enters Sagnac gate of FIG. 4C and exits as output X. In a similar manner, if an input J enters coupler 406 and Sagnac interferometer of FIG. 4C in the absence of a control input signal CI, the input J is outputted as output X. When control signal CI is present, however, the input J outputs as output Y. In accordance with the operation of the Sagnac exchange/bypass switch of FIG. 4C, when both inputs I and J are present and a control signal CI is present the input I exits as output X and the input J exits as output Y.

Truth table shown as FIG. 4D illustrates the various inputs and output signal relationships and how they are affected by control signal CI. As shown by 411 truth table, when neither input I or J are present, no outputs X or Y exist, irrespective as to whether control signal CI is present. As shown in line 412, if input signal J is present, in the absence of a control signal CI the J input exits as output X. When a control input signal CI is present, however, the input signal J outputs as output Y. As shown by line 413 of the truth table if an input I is present, without a control input CI, it is outputted as output Y, however, if a control input CI is present, the input I is outputted as output X. The line 414 of truth table depicts the exchange/bypass switch operation. With reference to line 414 of the truth table, when both an input I and J are present, without a control signal CI, they are outputted respectively as outputs Y and X, respectively. However, when control input CI is present, the input I is outputted as output X while the input J is outputted as output Y. Thus, with the control signal CI present the input signals I, J effectively cross over to the opposite outputs X, Y, respectively.

Since, in our FIG. 2, line 201 example, routing bit $A_0$ was logic 1, the input $A_1$ is outputted as output X of demultiplexer 170. In a similar way, when the input $B_1$ is receiver over lead 136 concurrently with the routing bit $B_0$ on lead 169, the Sagnac exchange/bypass switch 170 causes the input $B_1$ to be outputted on output Y of demultiplexer 170, since the routing bit $B_0$ is logic 0. Similarly, the inputs $C_1$ and $D_1$ are also outputted on output Y because their corresponding routing bit $C_0$ and $D_0$ are also at logic 0. The routing bits $A_0$–$D_0$ continue to demultiplex the multiplexed data stream $A_2$–$D_2$, $A_3$–$D_3$, etc. As a result of this demultiplexing the outputs on lead X would be $A_1$, $A_2$, $A_3$, etc., while the outputs on lead Y would be $B_1$, $C_1$, $B_2$, $C_2$, $B_3$, $C_3$, etc. Thus, the Sagnac exchange/bypass switch 170 has demultiplexed the multiplexed data stream $A_1$, $B_1$, $C_1$, $A_2$, etc., into one of two outputs X or Y depending on the routing bit signals $A_0$–$D_0$.

Figure 5:
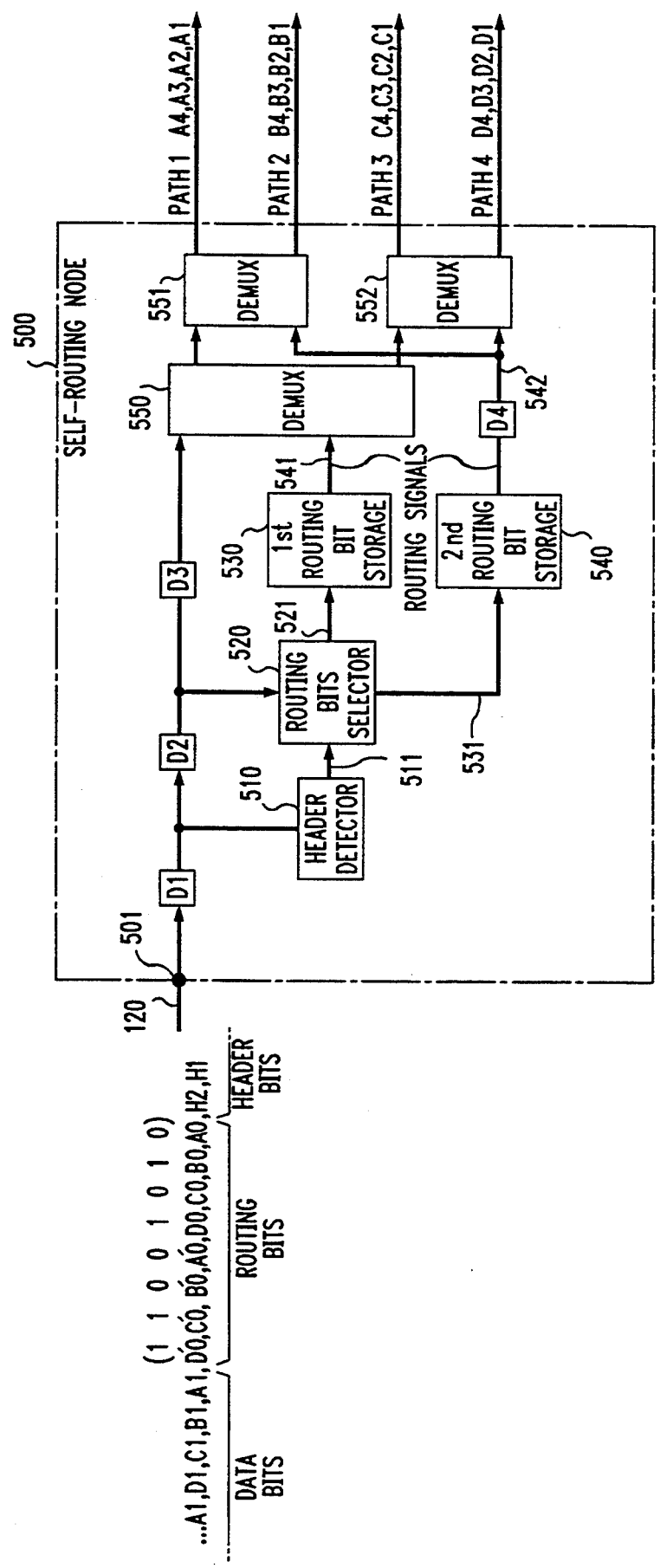
FIG. 5 shows an illustrative block diagram of a multistage self-routing optical communication node.

FIG. 5 shows an illustrative block diagram of a multistage, self-routing optical communication node 500. The self-routing node 500 includes means for receiving 501 an N channel multiplexed optical data signal. The self-routing node 500 also includes header detector 510; routing bit selector 520; routing bit storage circuits 530 and 540; one-to-two demultiplexers 550, 551 and 552; and a number of delays $D_1$, $D_2$, $D_3$ and $D_4$. The implementation and operation of these circuits are similar to those of FIG. 1. The multiplexed optical data signal includes header bits H1 and H2 and two routing bits for each data channel. Thus, in our example, where we have four data packets A–D there will be two routing bits, $A_0$ and $A_{0'}$ for data packet A, and so forth including routing bits $D_0$ and $D_{0'}$ for data packet D. The routing bits $A_0$ and $A_{0'}$ represent a binary number where $A_0$ is the most significant bit and $A_{0'}$ is the least significant bit. Following the routing bits, we have data bits from each of the four data packets A through D.

The header detector circuit 510 detects header bits H1 and H2. If the header bits H1 and H2 have a predesignated bit pattern, a header start signal or routing bit select signal 511 is generated. The routing bit selector circuit 520 causes routing bits $A_0$, $B_0$ through $C_{0'}$, $D_{0'}$, received over path 120, to be stored in either the first routing bit storage circuit 530 or the second routing bit storage circuit 540. The routing bit selector circuit 520 is enabled by the routing bit select signal 511. Routing bit selector 520 selects the odd routing bits for output over lead 521 and selects the even routing bits for output over lead 531. The most significant bits $A_0$ through $D_0$ of the routing bits are stored in first routing bit storage circuit 530. The least significant routing bits $A_{0'}$ through $D_{0'}$ are stored in the second routing bit storage circuit 540. The first routing bit storage circuit 530 generates a cyclically recurring channel data routing signal 541 which controls demultiplexer 550. The second routing bit storage circuit 540 generates a channel data routing signal 542 which controls demultiplexer 551 and 552. The delay circuits D1, D2 and D3 ensure that the proper delay is provided to the multiplexed optical data signal so that the proper timing exists for each of the circuits.

If we assume that the routing bits $A_0$ and $A_{0'}$ are, respectively, both logic 0, then data packet A will be outputted at path 1 of demultiplexer 551. If, in our example, we assume that the routing bits $B_0$ and $B_{0'}$ are 0 and 1, respectively, then bits $B_1$, $B_2$, etc. of data packet B will be outputted at path 2. Our example further assumes that routing bits $C_0$ is logic 0 and $C_{0'}$ is logic 1 causing the output of bits $C_1$, $C_2$ etc. of data packet C to be outputted from demultiplexer 552 at path 3. Finally, we have assumed routing bit $D_0$ to be logic 1 and routing bit $D_{0'}$ to be logic bit 1 causing an output of bits $D_1$, $D_2$, etc. of data packet D to be outputted at path 4 of demultiplexer 552.

In our example, we have assumed that the number of data packet channels N (i.e., A, B, C and D) is equal to $2^R$ where R is the number of routing bits (i.e., 2). However, it should be understood that $2^R$ does not need to be equal to N, but could be greater than or less than N. When $N \geq 2^R$, then there are some data paths that contain the data of more than one data packet. This is shown by our FIG. 1 example, where N is equal to four and R is equal to one. Thus, the output path Y of demultiplexer 170 contains the data of data packets B, C and D. When $N \leq 2^R$, then there are some data paths that do not contain any data packet signals. (not shown).

It should be recognized that the present invention can be implemented using other arrangements of Sagnac gates. Thus, the Sagnac gates can be arranged together in other logical gate forms (NOR gates, exclusive OR gates, etc.) to implement the header detector 140, routing bit selector 150, routing bit storage 160, demultiplexer 170, and multiplexer 100 utilized in the present design. It should be recognized that the routing and data bits must be interlaced and that the repeat factor (i.e., time interval from $A_1$ to $A_2$) of the data bits should be equal to or greater than the latency of a Sagnac gate. Additionally, the timing between adjacent routing bits (e.g., $A_0$–$A_0'$) and the timing between the last routing bit ($A_0'$) and the first data bit ($A_1$) should also be equal to or greater than the latency of the Sagnac gate.

What has been described is merely illustrative of the application of the principles of the present invention. Other arrangements and methods can be implemented by those skilled in the art without departing from the spirit and scope of the present invention.

We claim:

1. An all-optical self-routing optical signal switching node apparatus comprising
    means for receiving an N channel multiplexed optical data signal including frame header bits, N channel multiplexed routing bits, each channel having at least one routing bit R assigned thereto, and N channel multiplexed data bits, where N and R are integers, $N \geq 2$ and $R \geq 1$,
    frame header detector means, including Sagnac switch means, for detecting said frame header bits and for generating a routing bit select signal,
    routing bit circular storage circuit, including Sagnac switch means and an optical memory loop connected thereto, for detecting and storing said routing bits in response to said routing bit select signal and for cyclically generating a recurring channel data routing signal once every N data bits and
    optical demultiplexer circuit, including Sagnac switch means, responsive to said channel data routing signal, for demultiplexing each channel of said received N channel multiplexed data bits onto one of $2^R$ optical data output terminals selected using said channel routing signal.

2. The apparatus of claim 1 wherein said frame header detector includes one Sagnac switch means for each of said frame header bits.

3. The apparatus of claim 2 wherein a clock signal of said received N channel multiplexed optical data signal is used as a control signal of at least one of said Sagnac switch means.

4. The apparatus of claim 1 wherein said frame header detector generates said routing bit select signal when it detects a unique bit pattern in said header bits.

5. The apparatus of claim 1 wherein said frame header detector generates said routing bit select signal when it detects a predetermined time spacing between at least two header bits.

6. The apparatus of claim 1 wherein said routing bit storage circuit includes
    first Sagnac switch means for writing said routing bits into said routing bit storage circuit in response to said received routing bit select signal and
    second Sagnac switch means for clearing previously stored routing bits from said routing bit storage circuit in response to said received routing bit select signal.

7. The apparatus of claim 6 wherein said routing bit storage circuit includes a fiber loop memory connected between an output (X) and input (I) of said second Sagnac switch means, said fiber loop memory and said second Sagnac switch means storing N routing bits.

8. The apparatus of claim 1 wherein said optical demultiplexer circuit includes a Sagnac switch means including
    1) two inputs I,J connected to said received N channel multiplexed optical data signal;
    2) two outputs X,Y each providing one of said optical data output terminals;
    3) one control signal CI, derived from said channel data routing signal; and
    wherein, when said control signal is absent, an input I creates an output X and an input J creates an output Y and wherein, when said control signal is present, an input I creates an output Y and an input J creates an output X.

9. The apparatus of claim 1 wherein the time between adjacent data bits of each data channel is equal to or greater than the latency of said Sagnac switch means.

10. The apparatus of claim 1 wherein multiple routing bits are used for each of the N data channels and wherein the time between adjacent routing bits, for a particular data channel, is equal to or greater than the latency of said Sagnac switch means.

11. The apparatus of claim 10 wherein, for each data channel, the time between the last routing bit and the first data bit is equal to or greater than the latency of said Sagnac switch means.

12. An all-optical self-routing optical signal switching node apparatus comprising
    means for receiving an N channel multiplexed optical data signal where $N \geq 2$, each channel including at least one routing bit R, where $R \geq 1$, and a plurality of data bits, routing bit circular storage circuit, including Sagnac switch means and an optical memory loop connected thereto, for detecting and storing said routing bits of said N channels and for generating a cyclically recurring channel data routing signal once every N bits and optical demultiplexer circuit, including Sagnac switch means, responsive to said channel data routing signal, for demultiplexing each channel of said received N channel multiplexed data bits onto one of $2^R$ optical data output terminals selected using said channel routing signal.

13. An all-optical communication system comprising optical signal multiplexer including means for receiving N optical data signals $N \geqq 2$, each including at least one routing bit R, $R \geqq 1$, and a plurality of data bits and means, including Sagnac switch means, for multiplexing each of said N optical data signals into an N channel multiplexed optical data signal and self-routing optical signal switching node apparatus including means for receiving said N channel multiplexed optical data signal, routing bit circular storage circuit, including Sagnac switch means and an optical memory loop connected thereto, for detecting and storing said routing bits and for generating a cyclically recurring channel data routing signal once every N bits and optical demultiplexer circuit, including Sagnac switch means, responsive to said channel data routing signal, for demultiplexing each channel of said received N channel multiplexed data bits onto one of $2^R$ optical data output terminals selected using said channel routing signal.

14. A method of operating an all-optical self-routing optical signal switching node apparatus comprising the steps of receiving an N channel multiplexed optical data signal including frame header bits, N channel multiplexed routing bits, each channel having at least one routing bit R assigned thereto and N channel multiplexed data bits, where N and R are integers, $N \geqq 2$ and $R \geqq 1$, detecting and storing said routing bits using Sagnac switch means and an optical memory loop connected thereto, and in response thereto cyclically generating a recurring channel data routing signal once every N data bits and in response to said channel data routing signal, demultiplexing, using Sagnac switch means, each channel of said received N channel multiplexed data bits onto one of $2^R$ optical data output terminals selected using said channel data routing signal.

* * * * *